United States Patent [19]
Ou

[11] Patent Number: 5,684,335
[45] Date of Patent: Nov. 4, 1997

[54] HIGH-EFFICIENT HYDRAULIC TORQUE GENERATOR COMPRISING PIVOTED ARMS ON AN ENDLESS BELT CARRIER

[76] Inventor: A-Lin Ou, No. 79-1, Ne Din Li, Chung Li City, Taiwan

[21] Appl. No.: 518,868

[22] Filed: Aug. 10, 1995

[51] Int. Cl.[6] .................................................. F03B 9/00
[52] U.S. Cl. .................................................. 290/54; 415/5
[58] Field of Search ........................ 290/54, 43; 406/77; 415/5; 198/707, 709, 712

[56] References Cited

U.S. PATENT DOCUMENTS

| | | | |
|---|---|---|---|
| 825,841 | 7/1906 | Kifer | 415/5 |
| 1,460,331 | 6/1923 | Tarbet | 415/5 |
| 1,470,909 | 10/1923 | Chapman | 415/5 |
| 2,010,788 | 8/1935 | O'hara | 198/535 |
| 4,112,686 | 9/1978 | Trotta | 60/639 |

Primary Examiner—Steven L. Stephan
Assistant Examiner—Christopher Cuneo
Attorney, Agent, or Firm—W. Wayne Liauh

[57] ABSTRACT

A high-efficiency hydraulic torque generator for generating maximum torque is disclosed. It contains (a) two spaced apart sprockets, a pair of chains mounted on the sprockets, a plurality of supporting arms pivotably mounted on the chains at a regular interval from one another; (b) a plurality of water buckets respectively mounted on an outer end of the supporting arms between a matching pair of the supporting arms; (c) a pivot fixing assembly for pivotably fixing each of the supporting arms onto the chain. The pivot fixing assembly includes a support arm bracket, a pivot for pivotably fixing the supporting arm to the support arm bracket, and a support wheel for supporting the supporting arm. The support wheel is positioned such that it will cause the supporting arm to be perpendicular to the chain when the supporting arm is conveyed to one side of the chain. The supporting arm will collapse toward the chain when it is conveyed to another side of the chain. By such an arrangement, a maximum torque can be obtained.

6 Claims, 7 Drawing Sheets

HIGH-EFFICIENT HYDRAULIC TORQUE GENERATOR COMPRISING PIVOTED ARMS ON AN ENDLESS BELT CARRIER

BACKGROUND OF THE INVENTION

In the conventional hydraulic generator, the turbine blades are driven directly with a water stream so as to generate power; the power generated with such generator is merely equal to the water potential energy minus the mechanical friction force; further, the used water can not be recovered for re-use; therefore, all the conventional hydraulic generators are installed at a spot where there is a plenty of water source. However, when the power is in short supply during summer time or during a drought season, the water will also be in a short supply; in that case, the user would have a difficult time making a decision between supplying power and saving water resource.

SUMMARY OF THE INVENTION

This invention is related to a high-efficiency hydraulic driving device for a generator, it comprises two spindles mounted in two sprockets on two base blocks respectively, and a chain mounted with a plurality of supporting arms. The outer end of each supporting arms will be opened (i.e., fully extended) at a given angle automatically upon moving to one side of the sprockets as a result of the gravity force. Then, the side of the supporting arm to be driven with a force will be perpendicular to the water stream so as to provide the maximum torque. As soon as the suppporting arms move to the other side of the sprockets, they will become pendent automatically. Then, a torque difference will be resulted between the two sides of the sprockets. In other words, a small input of hydraulic power can produce a larger dynamic output so as to generate more power.

DETAILED DESCRIPTION

Figure 1:
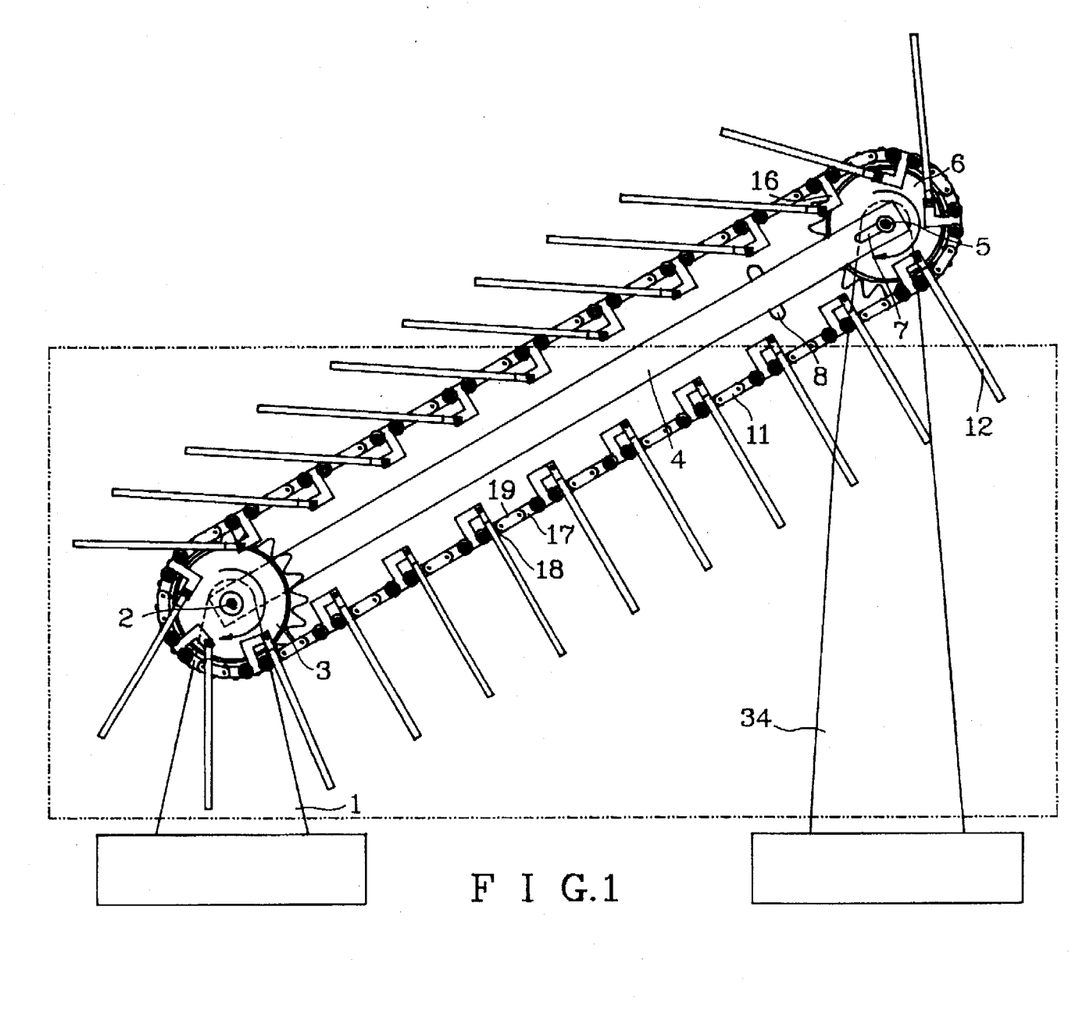
FIG. 1 is a plan view of the present invention.
Figure 2:
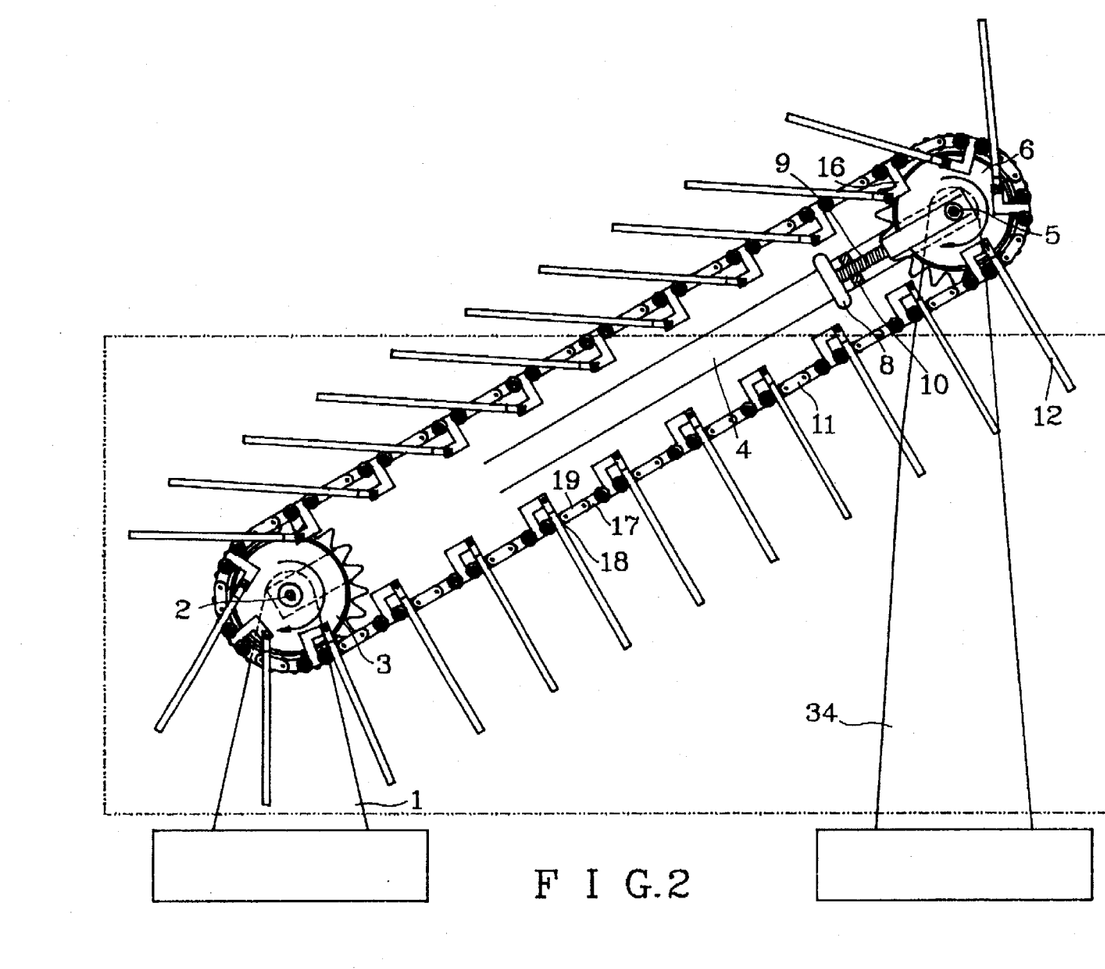
FIG. 2 is a plan view of the present invention with a fragmental section view thereof.

Referring to FIGS. 1 and 2, the plan view of the present invention comprises two base blocks 1 and 34 having different height. The top of the base block 1 is mounted with a spindle 2 to support a sprocket 3. The base blocks 1 and 34 are connected to two ends of a supporting frame 4, respectively. The upper end of the supporting frame 4 is mounted with a spindle 5 and a sprocket 6. The upper end of the supporting frame 4 is provided with a slot 7 to facilite the spindle 5 to move up and down so as to regulate the position of the sprocket 6 by means of a screw rod 9 and a screw hole block 10, and to adjust the tightness of a chain 11.

Figure 3:
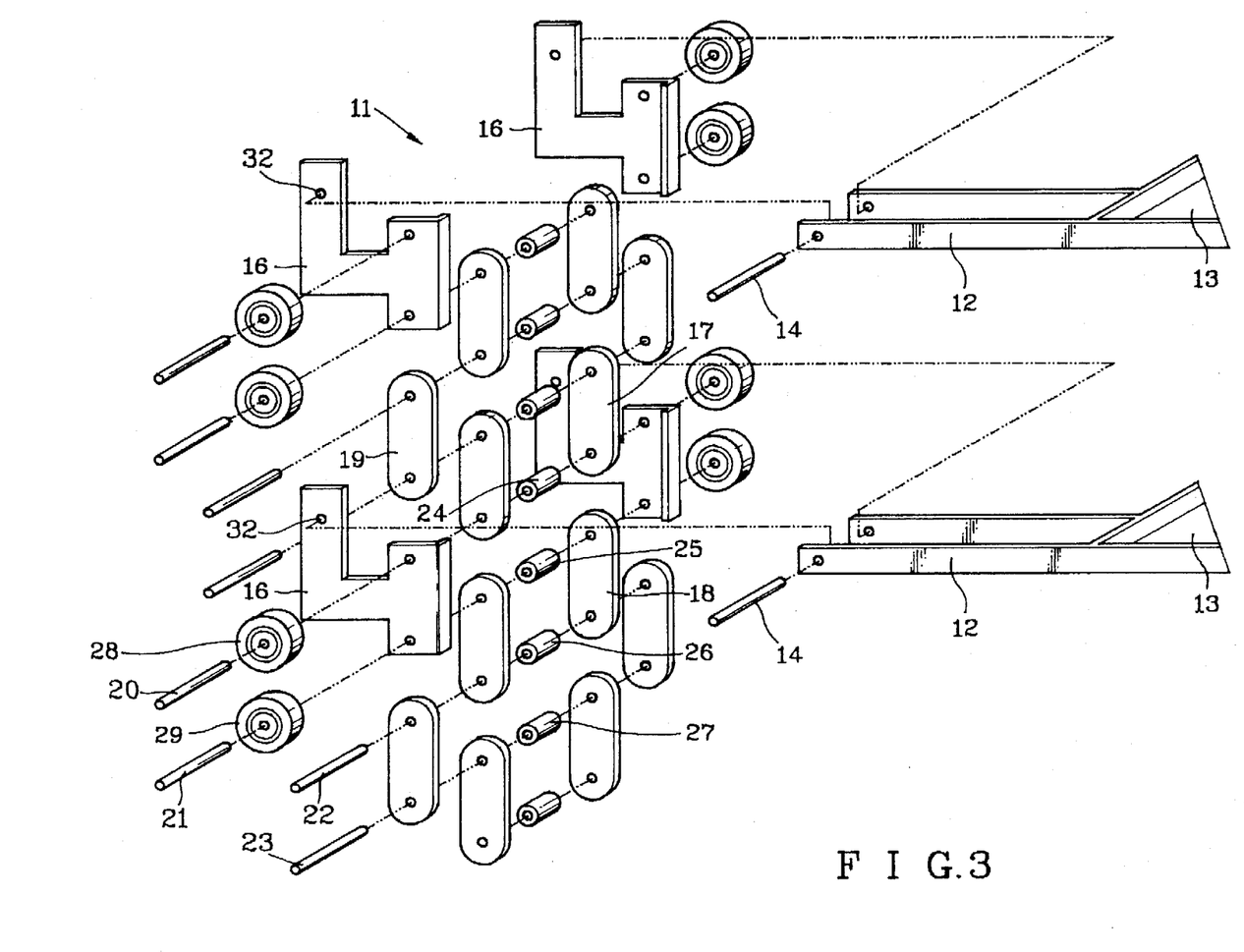
FIG. 3 is a disassembled view of the supporting arm and the chain-connecting structure according to the present invention.
Figure 4:
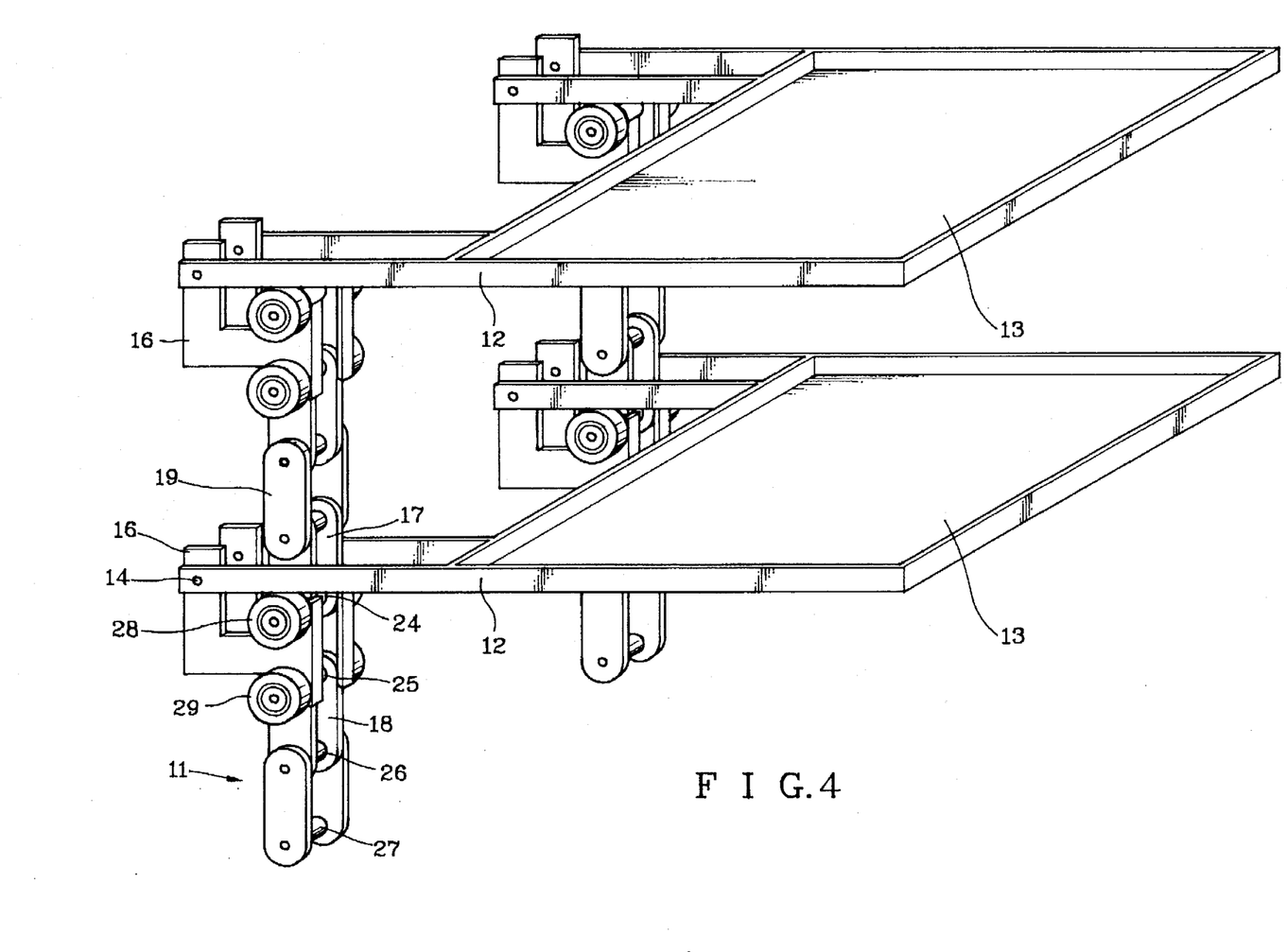
FIG. 4 is a perspective view of the supporting arm and the chain-connecting structure according to the present invention.

Referring to FIGS. 3 and 4, the supporting arm and the chain-connecting structure of the present invention are shown with a disassembled view and a perspective view, respectively. The chain 12 is used for connecting the two sprockets 3 and 6; a plurality of supporting arms 12 are movably mounted to the chain 11 at a regular distance from one another. The outer end of each supporting arm 12 is attached with a water scoop 13. The chain 11 includes several sets of supporting brackets 16, inner chain plates 17 and 18 and outer chain plates 19. Such chain plates are connected together by means of pins 20, 21 and 22 (since all the chain links are the same in structure, only one of them is described). Each of the pins 20, 21, 22 and 23 is mounted with one of rollers 24, 25, 26 and 27 between every two chain plates. Both ends of the pins 20 and 21 for the supporting arm bracket 16 are mounted on supporting wheels 28 and 29 respectively. The supporting arm 12 is fitted, by means of a salient pin 14, to the round hole 32 in the supporting arm bracket 16 so as to facilitate the supporting arm 12 to connect pivotally with the chain 11. By means of the supporting wheels 28 and 29 beside the supporting arm bracket, the supporting arm 12 can be opened at an angle of 90 degrees with respect to the chain 11.

As soon as the supporting arm 12 moves to the fight side of the sprockets 3 and 6, the supporting arm 12 will be opened automatically as a result of the gravity force acting thereon. And then the supporting wheels 28 and 29 can support against the bottom of the supporting arm 12 being almost perpendicular to the chain 11. The angle of the chain 11 is to set according to the slope of the terrain, and the height difference between the two base blocks so as to have the chain 11 set in parallel with a water stream. In other words, when the supporting arm 12 is opened at a large angle to be perpendicular to the water stream, the maximum driving force can be obtained. As soon as the supporting arm 12 moves to the left side of the sprockets 3 and 6, the supporting arms 12 will become pendent as a result of the gravity force acting thereon. And i.e., being at a smaller angle with respect to the direction of water stream, and then the supporting arm only having a minimum torque. Since the torque of the supporting arm 12 on the right side and the lower side of the sprockets 3 and 6 is much higher than that of the left side and the upper side thereof, the chain 11 will have a one-way movement (i.e., clockwise movement) as a result of the unbalanced torque between the left side and the right side. The spindle 2 of the sprocket 3 is an output shaft upon being coupled with a transmission case or a direct output member.

Figure 5:
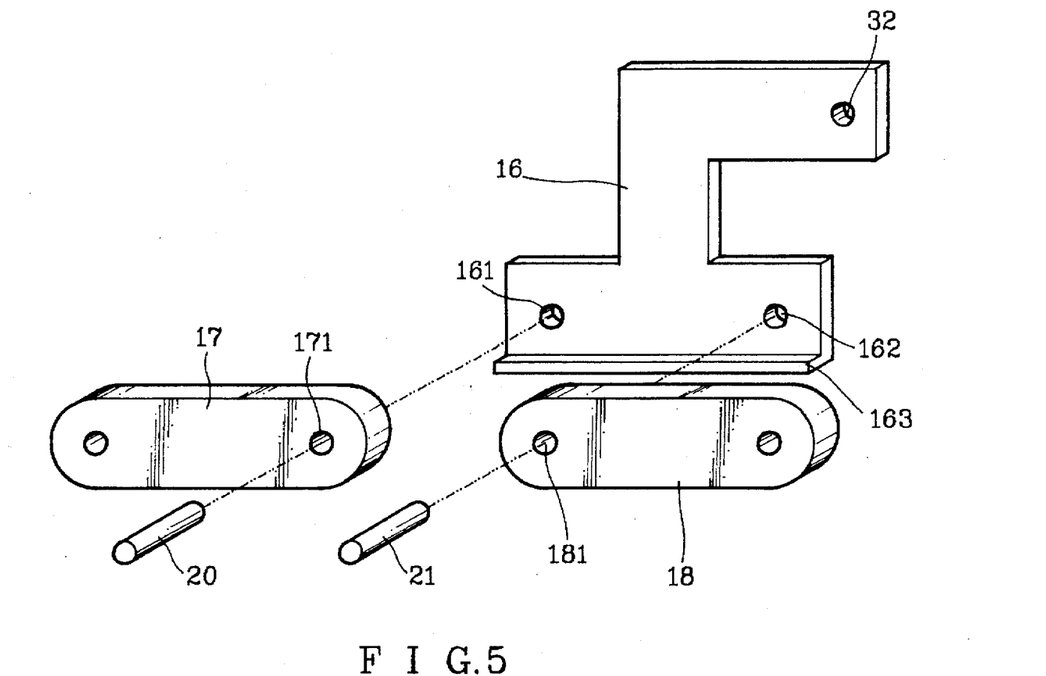
FIG. 5 is a disassembled view of the supporting arm bracket and the inner chain plate according to the present invention.
Figure 6:
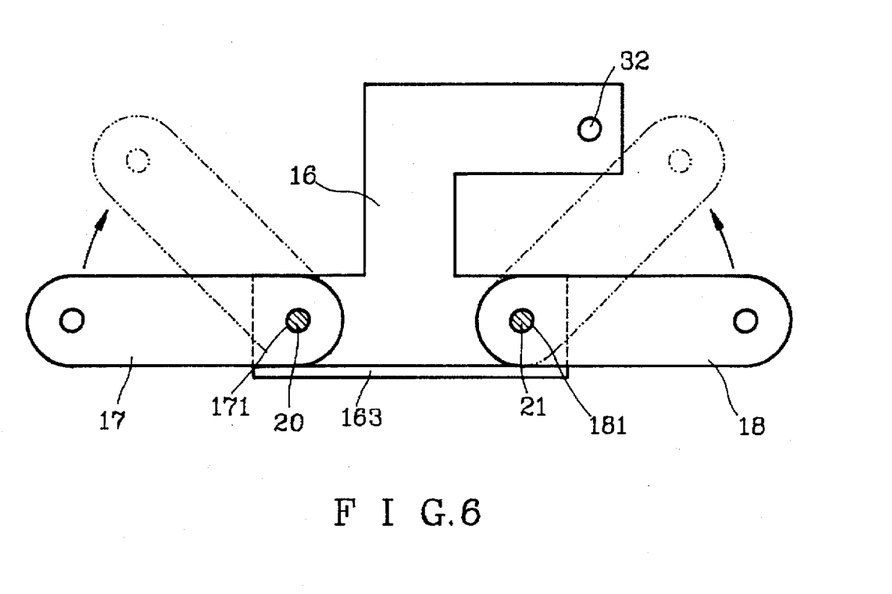
FIG. 6 is a plan view of the supporting arm bracket and the inner chain plate after being assembled together for operation according to the present invention.

Referring to FIGS. 5 and 6, the supporting arm and the inner chain plate according to the present invention are shown with a disassembled view and a plan view thereof. The supporting arm bracket 16 and the inner chain plate 17 and 18 are mounted in holes 161, 162, 171 and 181 by using pins 20 and 21 respectively. The lower edge of the supporting arm 16 has a flange 163 as shown in FIG. 6. As a result of the flange 163, the inner chain plates 17 and 18 can only turn in a direction as indicated with the arrow so as to limit the turning direction of the chain, and to prevent the chain from bending and shaking caused by the weight thereof; then the chain can move smoothly.

The present invention is good for installing at a slope spot having a considerable water head such as in a brook, a river or a stream, etc.; all the supporting arms 12 are to be operated under the water surface, and therefore the driving torque is much larger than that of an ordinary water mill or a turbine generator. The present invention may be added with more than one set of generator connected in parallel in accordance with the terrain feature and water stream condition so as to make the most of the water resources.

Figure 7:
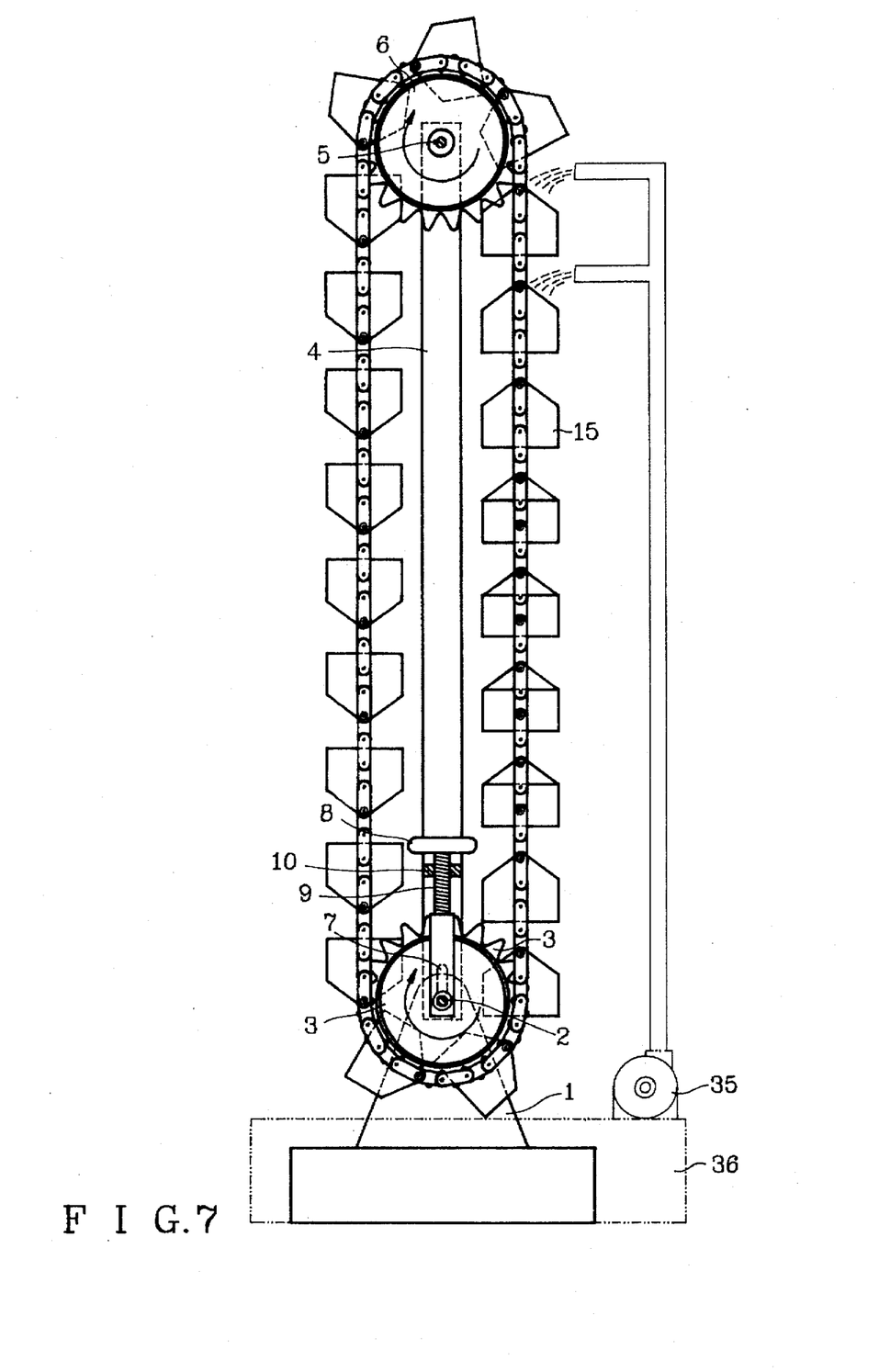
FIG. 7 is a plan view, showing another embodiment of the supporting arm according to the present invention.
Figure 8:
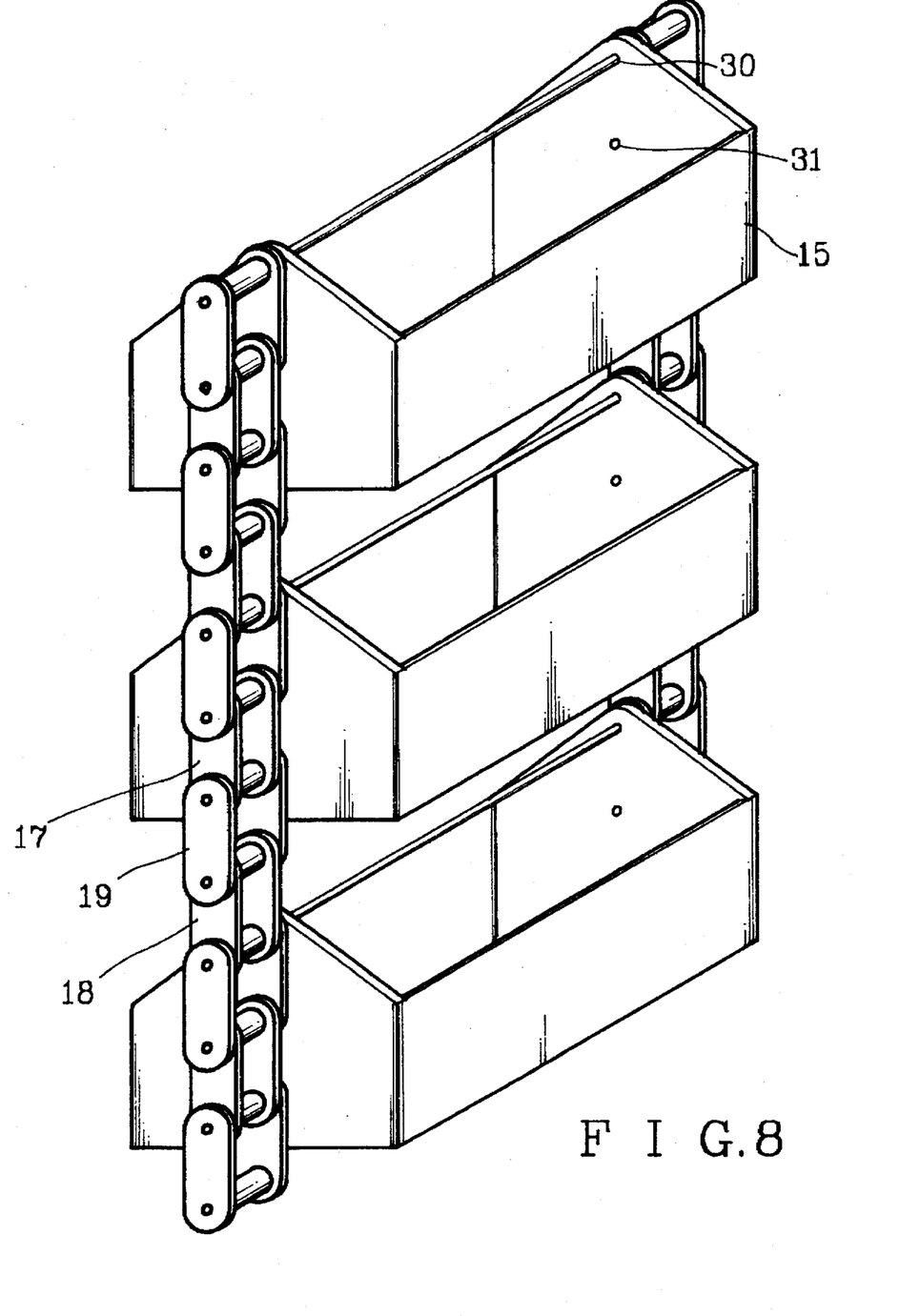
FIG. 8 is a fragmental perspective view of another embodiment of the supporting arm according to the present invention.

Referring to FIGS. 7 and 8, the present invention is shown with another embodiment by means of a plan view and a fragmental section view, in which the supporting arms are replaced with a plurality of water buckets 15; each end of the water bucket 15 is furnished with an upper hole 30 and a lower hole 31. A long shaft is mounted through the upper holes 30 on both ends of the water bucket and through both sides of two chains respectively. The lower holes 31 on both ends of the water bucket are fastened to the chain 11 by means of nuts. This embodiment is to be installed at a vertical position; the screw rod 9, the screw hole block 10, the mounted wheel 8 and the slot 7 are all installed on the lower part thereof so as to facilitate adjustment.

When the water buckets on the right side are filled with water, they would drive the chain 11 to move downwards as a result of gravity; since the buckets are fixedly mounted to the chain 11, the water in the buckets will be poured out upon a bucket moving to the lower right side of the frame; when a bucket moves to the left side of the frame, the bucket will be tamed to a reversed position in comparison with the buckets on the right side. The present invention has a feature which is never shown in the existing hydraulic generators, i.e., the water can be used repeatedly as shown in FIG. 7, in which a water reservoir 36 is provided at the bottom part of the device. The water poured out of the buckets can be stored in the water reservoir, and can be pumped to the top of the device by means of a water pump 35 for re-use. Therefore, a small amount of water can be used to generate a considerable mount of electric power without wasting water and without requiring a lot of space; it is good for a high building and a man-made water fall. The number and size of the buckets may be varied in accordance with the height of a water fall; two or more than two such device may be connected in parallel so as to provide a higher power supply. The present invention has no drawbacks of generating only limited power by using a given water stream as those conventional water-mills do.

By using different torques generated, the present invention possesses a potential rotating capacity, which can provide more output power upon combining with a water head. Through a transmission case, the present invention can be connected with a generator system. The output spindle 2 can be installed with a brake device so as to stop the device, if necessary. The present invention is deemed practical because of being simple in structure, which has less trouble, and can be repaired easily if necessary.

I claim:

1. A high-efficiency hydraulic torque generator comprising:

two spaced apart sprockets, a chain mounted on said sprockets, and a plurality of supporting arms pivotably mounted on said chain at a regular interval from one another;

fixing means for pivotably fixing each of said supporting arms on said chain, wherein said fixing means comprises a support arm bracket, a pivot means disposed inside of said chain for pivotably fixing said supporting arm to said support arm bracket, and a support wheel mounted on said chain for supporting said supporting arm so as to cause said supporting arm to be perpendicular to said chain when said supporting arm is on a first side of said chain, said support wheel and said pivot means are also positioned such that they allow said supporting arm to collapse toward said chain when said supporting arm is conveyed to another side of said chain; and whereby when one of said supporting arms is conveyed to said first side of said chain, said pivot means and said wheel cooperatively cause said supporting arm to be perpendicular to said chain so as to provide maximum positive torque, and when one of said supporting arms is conveyed to another side of said chain, and said supporting arm will collapse toward said chain so as to minimize a negative torque.

2. A high-efficiency hydraulic torque generator as claimed in claim 1 which further comprises a screw rod and a manual wheel to change a distance between said two sprockets so as to change a tension of said chain.

3. A high-efficiency hydraulic torque generator as claimed in claim 1, wherein bottom of said supporting arm bracket for mounting said supporting arm is provided with a flange at an angle of 90 degrees, and said flange being used to limit an inner chain plate mounted on said supporting arm bracket to turn in one direction only.

4. A high-efficiency hydraulic torque generator as claimed in claim 1, which comprises two of said chains, each chain comprising one set of said plurality of support arm brackets, pivot means supporting arms, and a plurality of water buckets respectively placed at an outer end of said supporting arms.

5. A high-efficiency hydraulic torque generator comprising:

two spaced apart sprockets, a pair of chains mounted on said sprockets, a plurality of supporting arms pivotably mounted on said chains at a regular interval from one another;

a plurality of water buckets respectively mounted on an outer end of said supporting arms between a matching pair of said supporting arms;

fixing means for pivotably fixing each of said supporting arms on said chain, wherein said fixing means comprises a support arm bracket, a pivot means disposed inside of said chain for pivotably fixing said supporting arm to said support arm bracket, and a support wheel mounted on said chain for supporting said supporting arm so as to cause said supporting arm to be perpendicular to said chain when said supporting arm is on a first side of said chain, said support and said pivot means are also positioned such that they allow said supporting arm to collapse toward said chain when said supporting arm is conveyed to another side of said chain; and whereby when one of said supporting arms is conveyed to said first side of said chain, said pivot means and said wheel cooperatively cause said supporting arm to be perpendicular to said chain so as to provide maximum positive torque, and when one of said supporting arms is conveyed to another side of said chain, and said supporting arm will collapse toward said chain so as to minimize a negative torque.

6. A high-efficiency hydraulic torque generator comprising a plurality of hydraulic torque generating units, each said hydraulic torque generating unit comprising:

two spaced apart sprockets, a pair of chains mounted on said sprockets, a plurality of supporting arms pivotably mounted on said chains at a regular interval from one another;

a plurality of water buckets respectively mounted on an outer end of said supporting arms between a matching pair of said supporting arms;

fixing means for pivotably fixing each of said supporting arms on said chain, wherein said fixing means comprises a support arm bracket, a pivot means disposed inside of said chain for pivotably fixing said supporting arm to said support arm bracket, and a support wheel mounted on said chain for supporting said supporting arm so as to cause said supporting arm to be perpendicular to said chain when said supporting arm is on a first side of said chain, said support and said pivot means are also positioned such that they allow said supporting arm to collapse toward said chain when said supporting arm is conveyed to another side of said chain; and whereby when one of said supporting arms is conveyed to said first side of said chain, said pivot means and said wheel cooperatively cause said supporting arm to be perpendicular to said chain so as to provide maximum positive torque, and when one of said supporting arms is conveyed to another side of said chain, and said supporting arm will collapse toward said chain so as to minimize a negative torque.

* * * * *